(12) United States Patent
Rajapandiyan et al.

(10) Patent No.: US 10,250,731 B2
(45) Date of Patent: Apr. 2, 2019

(54) CONTROL OF USER EQUIPMENT FUNCTIONALITY

(71) Applicant: Alcatel Lucent, Boulogne Billancourt (FR)

(72) Inventors: Karthick Rajapandiyan, Chennai (IN); Harikumar Pandurangan, Chennay (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/538,233

(22) PCT Filed: Dec. 29, 2015

(86) PCT No.: PCT/EP2015/081365
§ 371 (c)(1),
(2) Date: Jun. 21, 2017

(87) PCT Pub. No.: WO2016/113110
PCT Pub. Date: Jul. 21, 2016

(65) Prior Publication Data
US 2017/0353594 A1    Dec. 7, 2017

(30) Foreign Application Priority Data
Jan. 12, 2015  (EP) .................................... 15305018

(51) Int. Cl.
*H04M 1/64*   (2006.01)
*H04M 3/436*  (2006.01)
(Continued)

(52) U.S. Cl.
CPC ............ *H04M 1/665* (2013.01); *G06F 17/30* (2013.01); *H04M 1/006* (2013.01); *H04M 1/64* (2013.01);
(Continued)

(58) Field of Classification Search
CPC .. H04M 3/42195; H04M 1/64; H04M 3/2281; H04M 1/665; H04M 3/42153; H04M 1/006
(Continued)

(56) References Cited

U.S. PATENT DOCUMENTS 6,097,796  A  *  8/2000  Tanaka ................... H04N 1/327
                                                    379/100.06
2004/0032932 A1 *  2/2004  Kucmerowski ......... H04M 3/51
                                                    379/45
(Continued)

FOREIGN PATENT DOCUMENTS

JP    H1051552    2/1998
JP    2007166393  6/2007
(Continued)

*Primary Examiner* — Thjuan K Addy
(74) *Attorney, Agent, or Firm* — McCracken & Gillen LLC

(57) ABSTRACT

A method and apparatus provide for controlling the user equipment in a telecommunication network having a network control node. A method may be performed at the network control node and a method may also be performed at a user equipment within a telecommunication network. The method performed at the user equipment comprises: receiving an incoming call signal, the incoming call signal comprising a combined automatic answer and loudspeaker activation indication; in response to the incoming call signal, automatically answering the incoming call and activating a loudspeaker on the user equipment.

11 Claims, 4 Drawing Sheets

(51) Int. Cl.
*H04M 3/42* (2006.01)
*H04M 1/00* (2006.01)
*H04M 1/665* (2006.01)
*H04M 1/663* (2006.01)
*G06F 17/30* (2006.01)

(52) U.S. Cl.
CPC ....... *H04M 1/663* (2013.01); *H04M 3/42153* (2013.01); *H04M 3/42187* (2013.01); *H04M 3/436* (2013.01); *H04M 2242/04* (2013.01)

(58) Field of Classification Search
USPC .. 379/188, 195, 70, 207.02, 201.01, 201.08, 379/201.07
See application file for complete search history.

(56) References Cited

U.S. PATENT DOCUMENTS

2005/0100140 A1* 5/2005 Tsai .................. H04M 1/64
379/82
2010/0329441 A1 12/2010 Smith

FOREIGN PATENT DOCUMENTS

| | | |
|---|---|---|
| JP | 2009021752 | 1/2009 |
| JP | 2013102336 | 5/2013 |
| JP | 2013207320 | 10/2013 |
| KR | 20050042615 | 5/2005 |
| KR | 20120073332 | 7/2012 |
| KR | 20140141613 | 12/2014 |

* cited by examiner

CONTROL OF USER EQUIPMENT FUNCTIONALITY

FIELD OF THE INVENTION

The invention relates to the field of telecommunication networks and to the control of user equipment functionality within such networks.

BACKGROUND

In the field of telecommunications it is known to provide user equipment with certain functionality enabling them to be adapted to different situations. For example, a user equipment's method of notifying a user of incoming information such as an incoming call may be muted to avoid the user or other people around the user being disturbed. This has the disadvantage that the user is unaware of the incoming information and may not be notified of it in a timely manner.

It is also known to provide parallel ringing functionality within telecommunication networks, such that a call may be routed to several devices in parallel, a user answering the call on one device causing the calls to the other devices to be discontinued.

User equipment can also be configured to automatically answer incoming calls, allowing a user using headphones in association with a user equipment to be able to respond to a call without interacting with the user equipment itself, which may be useful when the user is driving for example.

There are circumstances where a user may not wish to be disturbed but where it is important that he is notified of certain events. It would be desirable to allow a user to receive certain incoming information, while not being disturbed by other incoming information.

US2010/0329441 discloses a phone that has an activation password or control code that allows an authorised caller to control the phone and in some cases to activate a remotely controlled hands-free audio function on the phone. The invention addresses the problem of a call recipient who is unable to acknowledge the presence of an incoming call in a timely manner, while recognising that many calls will be nuisance calls and the user may prefer not to answer them. The phone is configured such that it automatically answers any call and then requests validation. Where validation is forthcoming it activates the loudspeaker while where it is not it does not do so.

SUMMARY

A first aspect of the present invention provides a method performed at a user equipment within a telecommunication network comprising: receiving an incoming call signal, said incoming call signal comprising a combined automatic answer and loudspeaker activation indication; in response to said incoming call signal controlling said user equipment to automatically answer said incoming call and activate a loudspeaker on said user equipment.

The inventors of the present invention recognised that there are occasions where a user of a user equipment may wish not to be disturbed by incoming calls, but may have a requirement to be notified of certain events. These competing requirements can be addressed by the provision of an automatic answer and loudspeaker activation indication which may be associated with an incoming call signal, such that for certain incoming call signals, the user equipment will automatically answer the call and activate the loudspeaker such that any message spoken by the caller will be output by the loudspeaker, allowing a user provided that he is within the proximity of the user equipment to hear the message spoken by the caller and in this way to be notified of the situation without the need to answer the call or be aware of other incoming call signals that do not have such indications associated with them. This may be useful where the user is perhaps a doctor or other emergency worker who during his work should not be disturbed by incoming calls, but should be notified of certain emergency situations where his input may be required urgently.

It should be noted that the combined automatic answer and loudspeaker activation indication may be provided in a number of ways. In some cases a number on a caller's phone may be mapped to one or more specific user equipment and to this functionality. A user dialing such a number will have the call message transmitted to the mapped user equipment along with some form of indication that the call should be automatically answered and the loudspeaker activated. The dialed number may be a speed dial number allowing the one or more user equipment to be indicated quickly and efficiently by the dialer. The indication may be provided as an indicator within or associated with the call signal message, which the user equipment will be configured to recognise and respond to.

In some embodiments the user equipment is configurable such that a user may select whether or not they wish the user equipment at a particular time to support automatic answer and loudspeaker activation, while in other embodiments the user equipment may be configured at manufacture such that they always support this functionality.

In some embodiments, said step of configuring said user equipment is performed in response to an input signal received from a user selecting activation of said auto answer and loudspeaker activation function.

As noted above, although the configuration of user equipment may be performed at or immediately following manufacture such that it is permanently or at least semi-permanently configured to act in this way, in some cases it may be configured by the user such that the user may select enabling or disabling of the auto answer and loudspeaker activation function. In some cases, the transmission of this configuration information to the network may be performed in response to the user selecting a change in this functionality.

It may be desirable for a user to be able to select whether or not they wish the user equipment to auto answer and activate the loudspeaker or whether they wish to disable this function. For example, doctors working in hospitals may not wish to be disturbed when interviewing patients unless there is an emergency, in which case it is important that they are immediately made aware of this emergency. Providing their user equipment with an auto answer and loudspeaker activation function which they can configure to be active or disabled depending on whether they are currently working in the hospital or not, provides a convenient way of allowing them to be notified of an emergency and provided with information immediately without being disturbed by other less important calls.

Thus, in some embodiments the method comprises a further step of in response to an input signal from a user selecting disabling of said automatic answer and loudspeaker activation function, configuring said user equipment to no longer support said automatic answer and loudspeaker activation, and transmitting information regarding said configuration of said user equipment to a network control node within said telecommunication network In some embodiments, said step of transmitting said information is performed on registering said user equipment with said network.

Although the step of transmitting the information regarding configuration of the user equipment can be performed at different times and may simply be performed periodically, in some embodiments it is advantageous if it is performed on registering the user equipment with the network such that the network is aware once the user equipment is registered, whether this function is active or not. In this regard, it is unlikely that a user will change this function often and it is convenient when the user equipment registers with the network that the network is made aware of this functionality. In other embodiments, the user equipment may be configured to respond to a change in this configuration information to transmit this information to the network.

A second aspect of the present invention provides a user equipment comprising: a receiver operable to receive incoming call signals; a loudspeaker; and control logic, said control logic being operable in response to a received incoming call signal comprising a combined automatic answer and loudspeaker activation indication, to control said user equipment to automatically answer said incoming call and to activate said loudspeaker.

A third aspect of the present invention provides a method comprising receiving at a network control node an incoming call signal indicating a predetermined dialed number; identifying at least one user equipment mapped to said predetermined dialed number; generating a call signal comprising an automatic answer and loudspeaker activation indication; and transmitting said call signal with said combined automatic answer and loudspeaker activation indication towards said at least one user equipment.

This aspect of the present invention provides a method performed at a network control node which in a wireless telecommunication network may be a base station or it may be a server such as a proxy server where communications are performed using voiceover internet protocol communications. An incoming signal that indicates a call to a particular dialed number is received and the one or more user equipment mapped to that dialed number are identified and then a call signal is generated which comprises a combined automatic answer and loudspeaker activation indication and this is transmitted towards the user equipment indicated by the dialed number. In this regard, depending on the mapping it may be transmitted to a single user equipment or to a plurality of user equipment. The dialed number may be a speed dial number for example, to which one or more user equipment are mapped. The user equipment will respond to this call signal by automatically answering it and activating the loudspeaker such that whatever message is then transmitted will be conveyed to the user even where the user's user equipment is currently in silent mode.

In some embodiments, prior to generating said call signal, said method further comprises determining whether said at least one user equipment is currently configured to support an automatic answer and loudspeaker activation function; and in response to said determining step indicating said function is currently supported performing said step of generating said call signal.

In some cases call signals may be transmitted to any user equipment mapped to the predetermined number and it may be that only user equipment that currently support this combined auto answer and loudspeaker activation functionality are mapped to the number. In other embodiments, user equipment that may support this functionality at a certain time, may be mapped to the number and in this case prior to generating the call signal it may be advantageous to first determine whether the user equipment is currently configured to support a combined automatic answer and loudspeaker activation function. Only if the user equipment is so configured is the call signal with the auto answer and loudspeaker activation indication generated, otherwise the call signal may be dropped.

In some embodiments, said incoming call signal indicating said predetermined dialed number further comprises an automatic answer and remote loudspeaker activation request indicator.

The incoming call signal may itself comprise an automatic answer and remote loudspeaker activation request indicator such that the network control node will recognise from this indicator in the incoming call signal whether it should generate a call signal comprising a combined automatic answer and loudspeaker activation indication in response to this received number or not. Alternatively, in other embodiments, it may be that certain dialed numbers are mapped both to particular user equipment and to this functionality at all times, such that no explicit indicator is required with the call signal, the number dialed indicating this functionality.

In some embodiments, the method comprises an initial step of receiving at least one mapping of at least one predetermined number to at least one user equipment and storing said mapping in a database.

The mapping of the predetermined number to at least one user equipment may be transmitted by a user equipment to the network control node and stored therein. In this way, this mapping can be updated as required.

In some embodiments, said step of identifying said at least one user equipment mapped to said predetermined dialed number comprises accessing said database storing said mapping of said predetermined dialed number to said at least one user equipment.

The step of identifying the user equipment mapped to the predetermined dialed number may comprise accessing a database storing this mapping. In this regard, the database may be on the network control node or it may be in a remote location. In some embodiments, a plurality of user equipment are mapped to said predetermined dialed number and said step of transmitting comprises transmitting said call signal with said automatic answer and remote activation indication to each of said plurality of user equipment.

Although it may be a single user equipment that is mapped to the predetermined dialed number, in some embodiments a plurality of user equipment may be mapped to this number and in this case the call signal with the automatic answer remote activation indication is transmitted towards all of them. In some cases prior to this occurring it is determined for each whether they currently support this function and the call signal is only transmitted to those that do. Once received at the user equipment the call signal is automatically answered and the call is output via the activated loudspeaker so that any message spoken by the caller may be heard by a user in proximity to the user equipment. This may be useful in emergency situations where a plurality of emergency workers are all notified of the particular emergency circumstance at the same time.

In some embodiments, in response to determining that at least one of said at least one user equipment mapped to said predetermined dialed number is not currently configured to support said automatic answer and loudspeaker activation function, transmitting an indication of said lack of support to a source of said incoming call signal.

In some embodiments, when it is determined that one or more of the user equipment are not currently configured to support the automatic answer and loudspeaker activation, then this information is transmitted back to the source of the call signal. It may be important that the generator of the call signal is aware where certain user equipment are not currently configured to support this functionality and in particular if there are no user equipment that currently support it, then it is important that the transmitter of this information is aware that any information being transmitted, is not getting through to the user equipment not currently supporting the function.

In some embodiments, said step of determining whether said at least one user equipment is currently configured to support an automatic answer and loudspeaker activation function comprises transmitting a querying request to a device storing said configuration information and receiving a response from said device.

The step of determining whether or not the user equipment is currently configured to support an automatic answer and loudspeaker activation function may comprise querying a database storing this information and being periodically updated by signals from the user equipment. This database may be on the network control node itself or it may be on a remote node requiring a querying request to be transmitted to retrieve this information. In this regard, where for example communications are transmitted using a voiceover internet protocol (VoIP) system, then a plurality of servers may be used to transmit this information such that a proxy server may store the mapping and route the signals, but a further location server may store configuration information from the user equipment and thus, in order to determine whether or not a user equipment currently supports this function, a querying request may be needed to be sent to this device.

In some embodiments the method comprises receiving configuration information from at least one user equipment, said configuration information comprising information indicating whether said at least one user equipment currently supports an automatic answer and remote activation function; storing said configuration information; and in response to a query querying whether said at least one user equipment currently supports an automatic answer and remote activation function outputting said stored configuration information.

In some embodiments, a method is performed on a network control node where configuration information regarding user equipment is stored and this configuration information will include information as to whether the user equipment currently supports an automatic answer and remote activation function. This network control node will be configured to not only store this information but to respond to queries about it such that other network control nodes can determine whether a particular user equipment currently supports this function or not.

A fourth aspect of the present invention provides a network control node comprising: a receiver operable to receive an incoming call signal comprising an indication of a predetermined dialed number; determining logic operable to identify at least one user equipment mapped to said predetermined dialed number; and transmission logic operable to transmit a call signal comprising an automatic answer and loudspeaker activation indication to said at least one user equipment.

In some embodiments said determining logic is further operable to determine whether said at least one user equipment is currently configured to support an automatic answer and remote speaker activation function and said transmission logic is responsive to said determining logic indicating that said at least one user equipment is currently configured to support said function to transmit said call signal. The call signal not being transmitted where the determining logic indicates that the user equipment is not currently configured to support this functionality.

In some embodiments the network control node comprises a receiver for receiving configuration information from at least one user equipment, said configuration information comprising information indicating whether said at least one user equipment currently supports an automatic answer and remote activation function; a data store for storing said configuration information; output circuitry; and control logic responsive to a query querying whether at least one user equipment currently supports an automatic answer and remote activation function to control said output circuitry to output said stored configuration information.

A fifth aspect to the present invention provides a method performed at a user equipment within a wireless telecommunication network comprising: transmitting at least one mapping of at least one predetermined number to at least one other user equipment said at least one other user equipment being configured to support a combined automatic answer and loudspeaker activation at least some of the time to a network control node along with an indication of a combined automatic answer and loudspeaker activation function associated with said mapping.

The mapping of the predetermined number to at least one user equipment along with an indication that this predetermined number is associated with a request for automatic answer and loudspeaker activation may be transmitted to a network control node such that it can store the mapping and then when such a number is dialed, it can generate a call signal that may comprise an automatic answer and loudspeaker activation function indication which it can transmit to the at least one user equipment mapped to this number.

In some embodiments, the method comprises in response to a user dialing one of said at least one predetermined numbers, controlling said user equipment to display a user preference confirmation indicating that a user should confirm whether said automatic answer and loudspeaker activation function should be selected and in response to said user selecting said function, controlling said user equipment to transmit a call signal, said call signal indicating said predetermined number along with an automatic answer and remote loudspeaker activation request indication, and in response to said user not selecting said function, controlling said user equipment to transmit said call signal, said call signal indicating said predetermined number.

In some cases, the predetermined dialed number will indicate that an automatic answer and loudspeaker activation function should be applied to a user equipment mapped to this number if it currently supports the functionality. In other embodiments, the user can select whether it wants this function to be applied to the predetermined dialed number or not and thus, on dialing the number, a user preference confirmation will be displayed and the user equipment can confirm whether this function should be selected or not. Where it is selected then an automatic answer and remote loudspeaker activation request indication is transmitted along with the call signal and where it is not selected then no automatic answer and remote loudspeaker activation request indication is transmitted along with the call signal to the network control node.

A sixth aspect of the present invention provides a user equipment comprising a transmitter operable to transmit a mapping of at least one predetermined number to at least one other user equipment said at least one other user equipment being configured to support a combined automatic answer and loudspeaker activation at least some of the time to a network control node along with an indication of a combined automatic answer and loudspeaker activation function associated with said mapping.

A seventh aspect to the present invention provides a computer program operable when executed by a computer to control said computer to perform said method according a first, third, fifth or seventh aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Telecommunication networks are provided to allow user equipment to communicate with each other. With the increasing use of wireless telecommunication networks and mobile telephones in particular, it is desirable that these devices can on occasion be muted to avoid the user being disturbed when performing important tasks. However, there may be circumstances where it is important that a user or a group of users can be contacted without delay.

Thus, it may be desirable to map a speed dial number to a set of user equipment belonging to a group of people that may be required to act in a certain emergency situation. In this way a caller ringing this single number will have the call routed to the set of user equipment. Furthermore, the user equipment may be configured to respond to a combined automatic answer and loudspeaker activation indication within the incoming call signal, which may be a call initiation message or an invite message, to both automatically answer the call and to activate the loudspeaker on the device. In this way even were the user equipment to be set to mute such that the user is unaware of most incoming calls, this speed dialed number will trigger the user equipment to which it is mapped to both receive the call and to output the message from the caller from the loudspeaker.

One example of the use of such an embodiment is in a hospital. Many busy professionals like doctors do not like mobile phone distraction during their work time and often put their mobile phones into silent mode or do not pay attention to any incoming calls. However, the call may on occasion be an emergency call. In such emergency circumstances it would be desirable if the doctor's phone can be made to autoactivate the loudspeaker and be forced to auto-answer the incoming calls such that the doctor is made aware of the emergency situation without the need for him to manually answer the call.

When an incoming call is marked for "Remote speaker activation" the phone will override the current phone setting(s) and activate the auto answer feature and the phone's loudspeaker.

Figure 1:
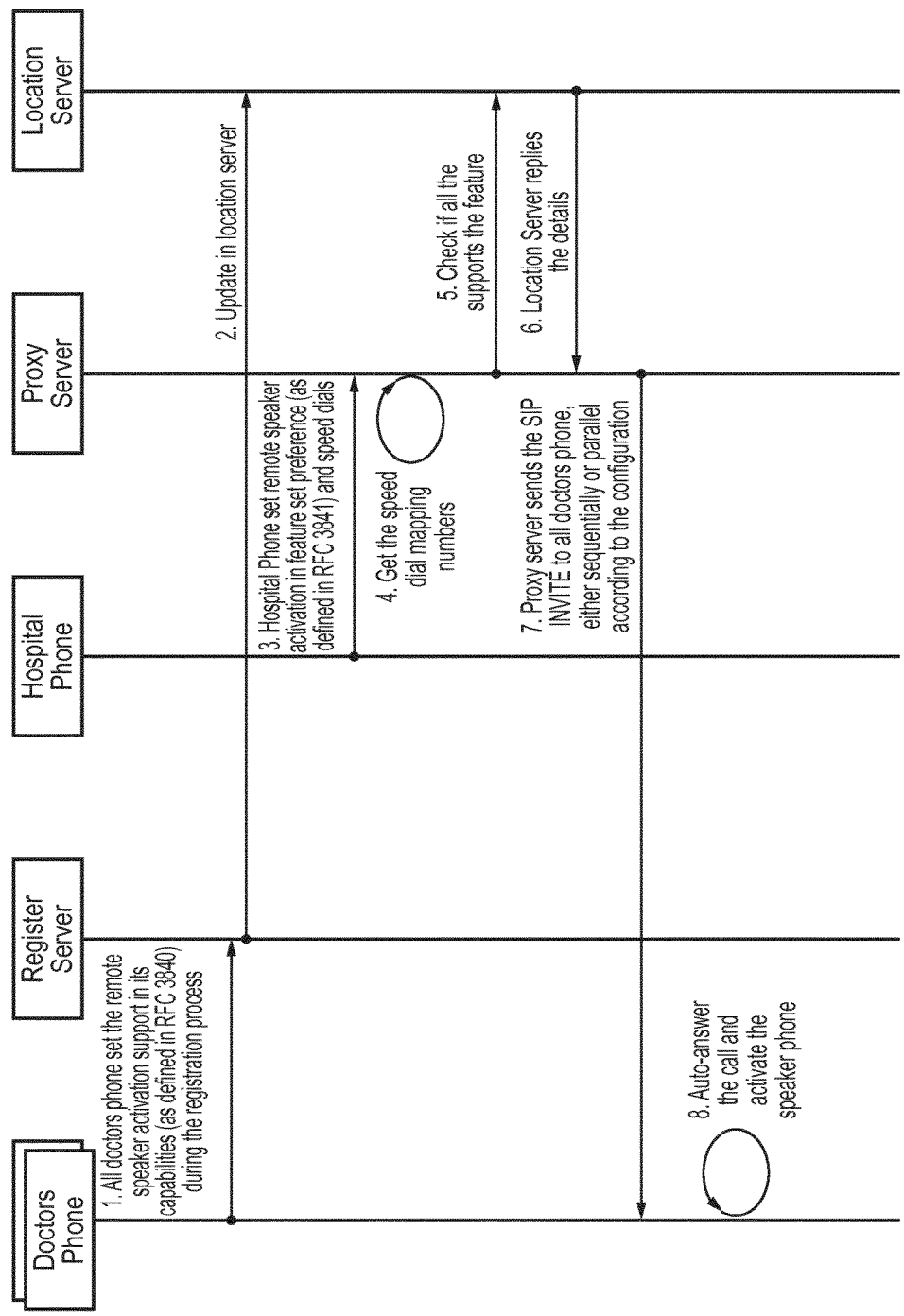
FIG. 1 shows a signal flow between different components performing a method according to an embodiment.

One implementation of this for a VoIP system is shown in FIG. 1.

1) The subscriber can subscribe to a network based speed dial feature where for each of a number of short codes (the speed dial numbers) a list of numbers can be mapped and stored in his/her profile.
2) In the case of a VoIP telecommunication system, during the SIP (session initiation protocol) register, the UE(s) sets and sends the "Remote speaker activation" capability to the register server. The standards mentioned in RFC 3840 are followed for this process.
3) The register server records this information in a location server.
4) During the call setup, the caller sets the "Remote speaker activation" in feature set preferences header(s) as defined in RFC 3841 and speed dials a short code.
5) On the signalling path, the proxy server that owns the domain that is in the request URI (uniform resource identifier) gets the mapped list of numbers for the short code and processes the caller preference header and checks the called parties' capabilities.
6) If the destination UE s support this feature then the proxy server forwards the invite to the destination, else the call is dropped by sending the usual reject message.
7) On the destination SIP client, upon receiving the invite with "Remote speaker activation" marked, the rest of the process is taken care of by the corresponding application to auto answer the call and activate the speaker. Upon call disconnect all the settings that were altered will be restored.

A charge may be made by the telecommunication network operator for providing the functionality required to allow this special call.

The technology relates in particular, to mobile phone communication, emergency alert etc.

Figure 2:
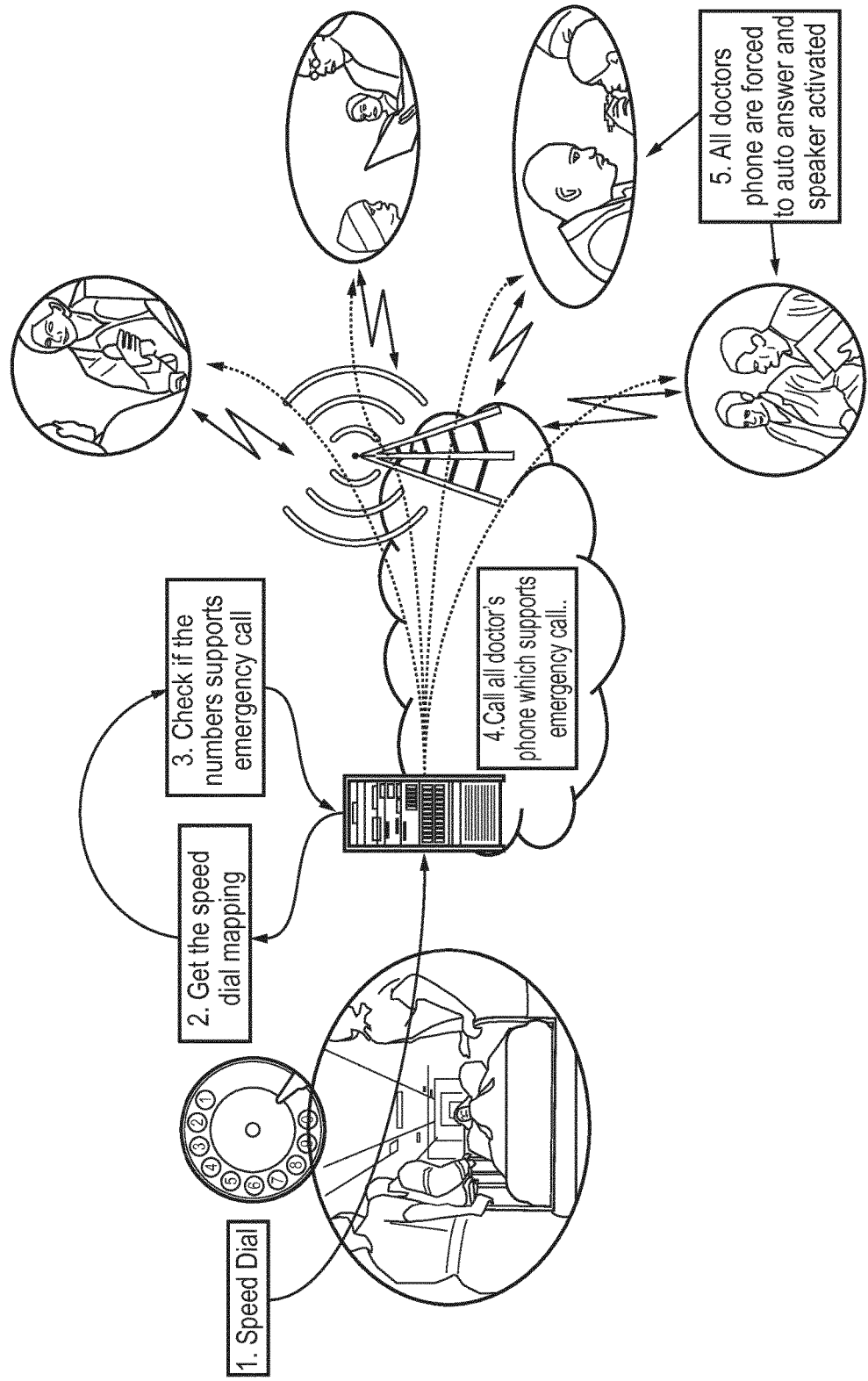
FIG. 2 illustrates schematically the use of an embodiment in a hospital.

Example 1 (shown in FIG. 2)

In a hospital, consider that a child is admitted in an emergency situation and urgently needs a pediatric surgeon's consultation. The following are the sequence of steps involved to urgently call the relevant doctors.

1) One of the speed dial numbers is mapped to all the pediatric surgeons phones, which are themselves set with the remote speaker activation support in their capability (as defined in RFC 3840) during the registration process.
2) When the child is admitted, hospital nurse speed dials the number that is mapped to all pediatric surgeons. Let us say "5" is mapped to all pediatric surgeons who work in the hospital. The call is also specially marked as "Remote speaker activation" in the feature set preference as defined in RFC 3841.

3) The proxy server retrieves the mapped numbers for the speed dial number.
4) The proxy server then check which of these numbers currently support the "Remote speaker activation".
5) The proxy server set INVITE to all the numbers that supports the "Remote speaker activation".

As outlined above a speed dial number may be used to send a call to one or more user equipment in parallel that are configured to auto answer and activate their loudspeakers in response to the call. In order to facilitate this functionality there may be adaptations at the network control node(s) within the telecommunication network and at the user equipment.

Figure 3:
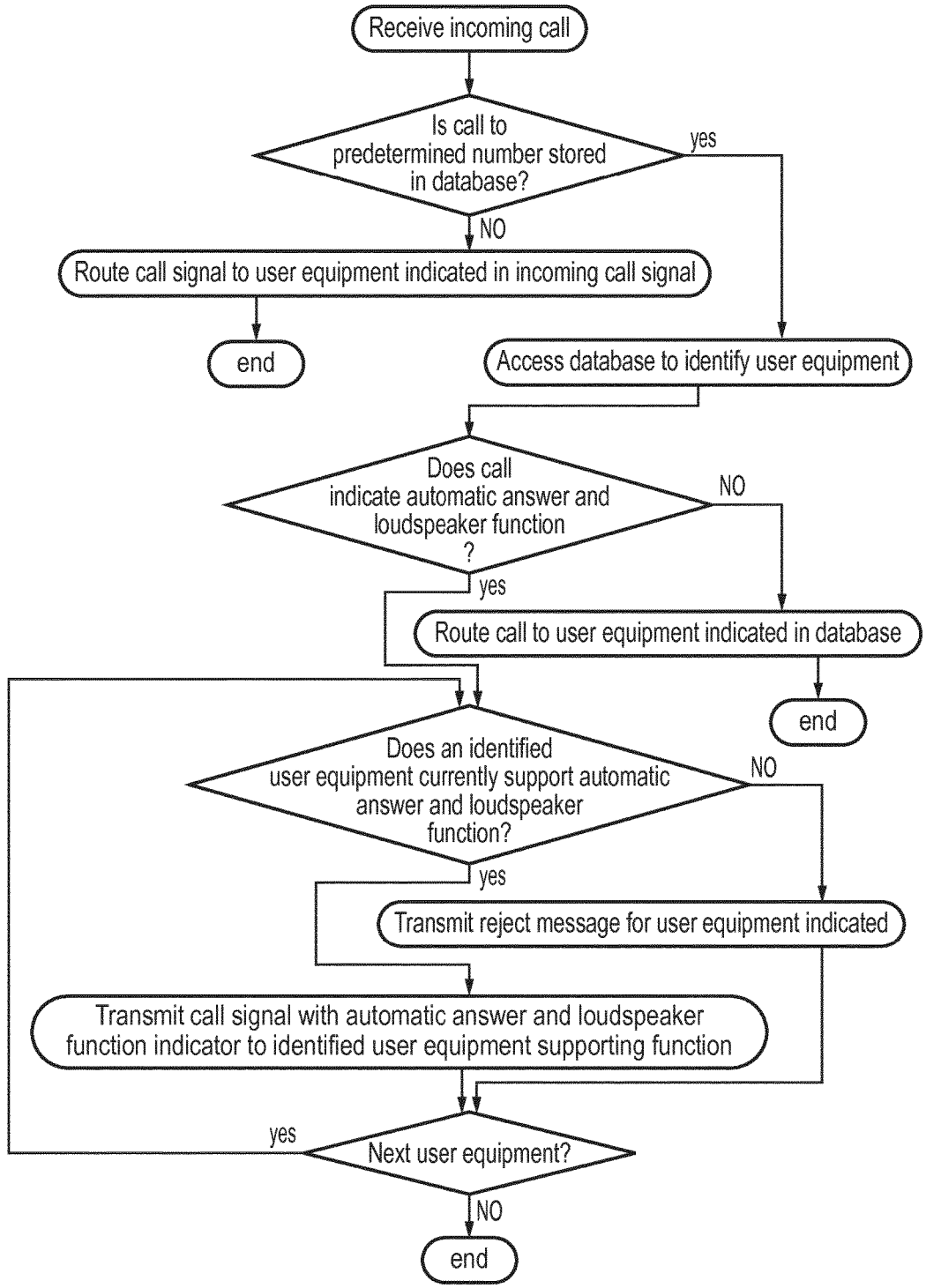
FIG. 3 illustrates a flow diagram showing steps of a method performed at a network control node according to an embodiment.

FIG. 3 shows steps in a method performed at a network control node according to an embodiment. This may, for example, be a base station in a mobile telecommunication network such as an LTE network, or it may be the proxy server in the telecommunication network illustrated in FIG. 1.

An incoming call is received at the network control node and it is determined if the call is to a predetermined number that is stored in a database. In this regard, the network control node has a database of numbers that may support an automatic answer and loudspeaker activation functionality. These numbers may have been transmitted to the network control node from participating user equipment. In some cases this database may store the mapping of a speed dial number to a single user equipment that supports this functionality or it may store the mapping of a speed dial number to a plurality of user equipment that supports this functionality, or it may simply store user equipment numbers to which this functionality may apply.

If the predetermined number is not stored in the database, then the call signal is routed to the user equipment in the usual way. If it is stored in the database, then the database is accessed to identify the user equipment to which this number is mapped.

The call signal may indicate whether the automatic answer and loudspeaker functionality is requested by this particular call and if it is not requested, then the call is routed to the user equipment indicated in the database. If it is indicated that this functionality is required, then for each user equipment to which the number dialed is mapped, it is determined whether the identified user equipment currently supports the automatic answer and loudspeaker functionality. If it does not, then a reject message for that user equipment is transmitted and the call is dropped for that user equipment and the next user equipment is considered. If the identified user equipment does support the automatic answer and loudspeaker functionality, then the call signal with an indicator that the automatic answer and loudspeaker functionality is requested, is transmitted to that user equipment and the next user equipment within the database is considered and the process is repeated. In this way, all of the user equipment to which the number is mapped that currently support automatic answer and loudspeaker functionality will receive the call signal with this indication and they will all respond to the call signal by answering and activating their loudspeakers, such that each of the user equipment will output the message transmitted by the caller.

Figure 4:
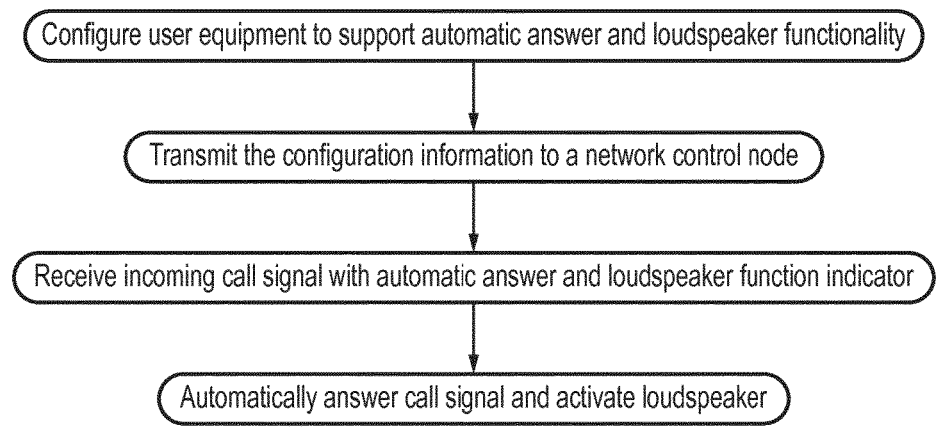
FIG. 4 illustrates a flow diagram showing steps performed at a user equipment receiving incoming calls according to an embodiment.

FIG. 4 shows steps in a method performed at the user equipment receiving these call signals. The user equipment may be configured to support the automatic answer and loudspeaker activation functionality by a user and this information will be transmitted to the network control node such that the network control node is aware of which user equipment currently support automatic answer and loudspeaker functionality.

When an incoming call signal is received that has an automatic answer and loudspeaker function indicator, then the user equipment will respond to it by automatically answering the call signal and activating the loudspeaker. Later and not shown in this Figure, the user may configure the user equipment to no longer support automatic answer and loudspeaker functionality and this information will be transmitted to the network control node. The user who may for example be a doctor, may do this on leaving the hospital at the end of his shift.

Figure 5:
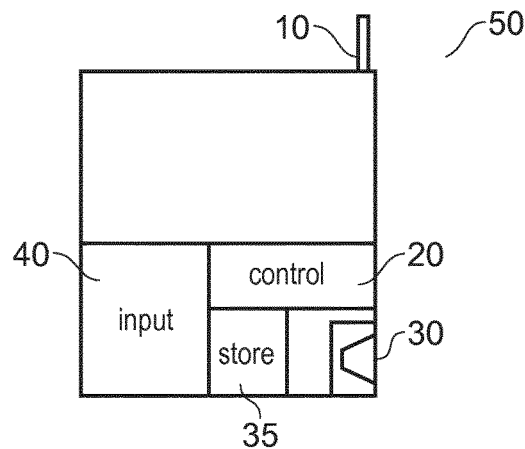
FIG. 5 shows a user equipment according to an embodiment.

FIG. 5 shows schematically a user equipment 50 according to an embodiment. User equipment 50 has an antenna 10 for transmitting and receiving signals along with control circuitry 20, a loudspeaker 30, input device 40 and a data store 35. Control circuitry 20 will control user equipment 50 to respond to an incoming call signal that has an automatic answer and loudspeaker function activation indicator by automatically answering the call and activating loudspeaker 30.

User equipment 50 also has input circuitry 40 to receive user inputs and the user may use this to configure the phone to support the automatic answer and loudspeaker functionality or to disable it. Thus, the user when arriving at work may configure the user equipment to support the automatic answer and loudspeaker activation functionality and on registering with the network, this configuration information will be transmitted to and stored at a network control node. On finishing work, the user may reconfigure the user equipment to no longer support this functionality and this configuration message will be transmitted to the network control node which will update the information it has for this user equipment.

Data store 35 may store this configuration information for the user equipment and it may also store speed dial numbers that a user has input. In the case that the user equipment is used to make calls to other user equipment with this automatic answer and loudspeaker activation functionality, the user equipment may store a mapping of set of user equipment that the user may wish to contact at a same time with a single call to a single speed dial number and in addition to storing this speed dial number in data store 35 it may transmit this mapping to a network control node. In some embodiments the speed dial number may be stored in data store 35 associated with a confirmation functionality such that on a user dialing the speed dial number a confirmation input request is automatically shown to the user. This requests the user to confirm whether he wishes the auto answer and loudspeaker activation function to be applied for this call. If he indicates an affirmative an auto answer and loudspeaker request indicator is sent with the speed dial call signal, while if not no such indicator is sent with the signal. In other embodiments there may be no confirmation required, the network control node being configured to apply an indicator to call signals transmitted to all user equipment mapped to this speed dial number and that currently support this auto answer and loudspeaker activation functionality.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods.

The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method comprising:
  receiving, at a network control node, an incoming call signal comprising an automatic answer and remote loudspeaker activation request indicator in one or more header fields and a predetermined dialed number;
  identifying, at the network control node, at least one user equipment mapped to said predetermined dialed number as indicated by configuration information associated with each at least one user equipment;
  generating a call signal to the at least one user equipment, said call signal comprising a combined automatic answer and loudspeaker activation indication; and
  transmitting said call signal with said combined automatic answer and loudspeaker activation indication towards said at least one user equipment.

2. The method according to claim 1, further comprising:
  receiving, at the network control node, the configuration information from at least one user equipment, said configuration information comprising information indicating whether said at least one user equipment currently supports a combined automatic answer and remote activation function; and
  storing said configuration information.

3. The method according to claim 2, further comprising prior to generating said call signal, determining whether said at least one user equipment is currently configured to support said combined automatic answer and loudspeaker activation function; and
  in response to said determining step, indicating said function is currently supported performing said step of generating said call signal.

4. The method according to claim 1, further comprising an initial step of receiving at least one mapping of at least one predetermined number to at least one user equipment, said at least one user equipment being configured to support said combined automatic answer and loudspeaker activation for at least some of the time; and
  storing said mapping in a database, wherein said step of identifying said at least one user equipment mapped to said predetermined dialed number comprises accessing said database storing said mapping of said predetermined dialed number to said at least one user equipment.

5. The method according to claim 4, wherein in response to determining that at least one of said at least one user equipment mapped to said predetermined dialed number is not currently configured to support said combined automatic answer and loudspeaker activation function, transmitting an indication of said lack of support to a source of said incoming call signal and not transmitting said call signal to said user equipment.

6. A network control node comprising:
  a receiver configured to receive an incoming call signal comprising an indication of a predetermined dialed number;
  determining logic configured to identify at least one user equipment mapped to said predetermined dialed number; and
  transmission logic configured to generate and transmit a call signal comprising an automatic answer and loudspeaker activation indication to said at least one user equipment.

7. The network control node according to claim 6, further comprising:
  a receiver configured to receive configuration information from at least one user equipment, said configuration information comprising information that indicates whether said at least one user equipment currently supports a combined automatic answer and remote activation function;
  a data store configured to store said configuration information;
  output circuitry; and
  control logic responsive to a query querying whether at least one user equipment currently supports an automatic answer and remote activation function to control said output circuitry to output said stored configuration information.

8. A method according to claim 1 wherein a user equipment within a wireless telecommunication network performs a step prior to the receiving step comprising:

transmitting at least one mapping of at least one predetermined number to at least one other user equipment, said at least one other user equipment being configured to support a combined automatic answer and loudspeaker activation at least some of the time to a network control node along with an indication of a combined automatic answer and loudspeaker activation function associated with said mapping.

9. The method according to claim 8, comprising in response to a user dialing one of said at least one predetermined numbers, controlling said user equipment to display a user preference confirmation indicating that a user should confirm whether said automatic answer and loudspeaker activation function should be selected and in response to said user selecting said function, controlling said user equipment to transmit a call signal, said call signal indicating said predetermined number along with an automatic answer and remote loudspeaker activation request indicator, and in response to said user not selecting said function, controlling said user equipment to transmit said call signal, said call signal indicating said predetermined number.

10. A user equipment within a wireless telecommunication network comprising a network control node, said user equipment comprising a transmitter configured to transmit a mapping of at least one predetermined number to at least one other user equipment, said at least one other user equipment being configured to support a call signal indicating a combined automatic answer and loudspeaker activation at least some of the time to the network control node along with an indication of a combined automatic answer and loudspeaker activation function associated with said mapping.

11. A non-transitory digital data storage medium storing computer executable instructions to perform said method according to claim 1.

* * * * *